US008112630B2

(12) United States Patent
Jung et al.

(10) Patent No.: US 8,112,630 B2
(45) Date of Patent: Feb. 7, 2012

(54) DEVICE, SYSTEM, AND METHOD FOR REPORTING EXECUTION FLOW OF PROGRAM

(75) Inventors: Myung-june Jung, Suwon-si (KR); Hyun-jin Choi, Suwon-si (KR); Kyung-im Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 910 days.

(21) Appl. No.: 11/851,508

(22) Filed: Sep. 7, 2007

(65) Prior Publication Data

US 2008/0155673 A1    Jun. 26, 2008

(30) Foreign Application Priority Data

Dec. 22, 2006    (KR) .................. 10-2006-0132967

(51) Int. Cl.
 *H04L 9/32*    (2006.01)
(52) U.S. Cl. ........ 713/176; 713/155; 713/156; 713/168; 717/124; 717/125; 717/126; 717/127; 717/128; 717/129; 717/130; 717/131
(58) Field of Classification Search .................. 713/155, 713/156, 168, 176; 717/124–131; 726/7; 714/38
See application file for complete search history.

(56) References Cited

U.S. PATENT DOCUMENTS

| | | | | |
|---|---|---|---|---|
| 6,308,270 | B1 * | 10/2001 | Guthery | 726/9 |
| 6,880,149 | B2 * | 4/2005 | Cronce | 717/126 |
| 7,380,170 | B2 * | 5/2008 | Sluiman et al. | 714/38 |
| 7,484,207 | B2 * | 1/2009 | Sato | 717/174 |
| 7,574,695 | B2 * | 8/2009 | Chander et al. | 717/126 |
| 7,721,154 | B1 * | 5/2010 | Jaamour et al. | 714/38 |
| 2008/0059799 | A1 * | 3/2008 | Scarlata | 713/176 |

* cited by examiner

*Primary Examiner* — Nabil El Hady
(74) *Attorney, Agent, or Firm* — NSIP Law

(57) ABSTRACT

A device, system, and method for reporting an execution flow of a program is provided. The system for reporting an execution flow of a program includes a program-providing server that provides a program package having information related a predetermined execution flow, a user device that transmits an execution-flow-reporting message corresponding to a result of measuring and verifying the execution flow integrity of a program package with reference to the information related with execution flow, and an execution-flow-verifying server that limits providing of or execution of a program package by testing the execution-flow-reporting message.

21 Claims, 11 Drawing Sheets

EXECUTION-FLOW-REPORTING DEVICE (300)

DEVICE, SYSTEM, AND METHOD FOR REPORTING EXECUTION FLOW OF PROGRAM

CROSS-REFERENCE TO RELATED APPLICATIONS

This application claims the benefit of Korean Patent Application No. 2006-132967, filed Dec. 22, 2006, in the Korean Intellectual Property Office, the disclosure of which is incorporated herein in its entirety by reference.

BACKGROUND OF THE INVENTION

1. Field of the Invention

Aspects of the present invention relate to an execution flow report of a program, and more particularly, to a device, system, and method for reporting an execution flow of a program, which generates an execution-flow-reporting message corresponding to a result of measuring and verifying the execution flow integrity of a program package operated in a user device, transmits the message to an execution-flow-verifying server, and limits providing or executing a program package by testing a state of the program based on the execution-flow-reporting message and execution-flow-reference information received from a program-providing server.

2. Description of the Related Art

Technologies for measuring and verifying the integrity of a program are used to detect forgeries. However, because the method of measuring integrity handles a program image at a certain point of time, it has been used only for verification. That is, because the related art integrity-measuring technology does not consider time, it is possible to find a forgery of a program image at a certain point of time, but it is not possible to get information about whether the program image has been forged before the measuring and restoration, which is a problem.

In order to solve this problem, a method of periodically measuring integrity has been suggested. However, as the program image becomes larger and is more frequently measured, more time and costs are required for measuring its integrity, which decreases the performance of the program and the system.

SUMMARY OF THE INVENTION

Several aspects of the present invention relate to testing whether a program is being executed in the way it was designed to be executed, to safely reporting the test result, to efficiently performing an execution-flow test in order to decrease the load of a system, and to taking responsive action corresponding to the result of the test.

According to an aspect of the present invention, there is provided a system for reporting an execution flow of a program, the system including a program-providing server that provides a program package having information related a predetermined execution flow, a user device that transmits an execution-flow-reporting message corresponding to a result of measuring and verifying the execution flow integrity of a program package with reference to the information related to execution flow, and an execution-flow-verifying server that limits providing or executing a program package by testing the execution-flow-reporting message.

According to another aspect of the present invention, there is provided a method of reporting an execution flow of a program, the method including providing a program package having information related a predetermined execution flow, transmitting an execution-flow-reporting message corresponding to a result of measuring and verifying the execution flow integrity of a program package with reference to the information related with execution flow, and limiting the providing or executing a program package according to the execution-flow-reporting message.

According to another aspect of the present invention, there is provided a device including a testing module to interpret instructions according to a program package and to process data; a registering module to store and to process data corresponding to an execution flow; an operation module to execute instructions according to the program package; a security module to establish trusts with other devices; and a control module to control operation processes of the modules, wherein the device receives the program package and measures, verifies, and/or tests the execution flow of a program contained in the program package to determine proper execution of the program.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
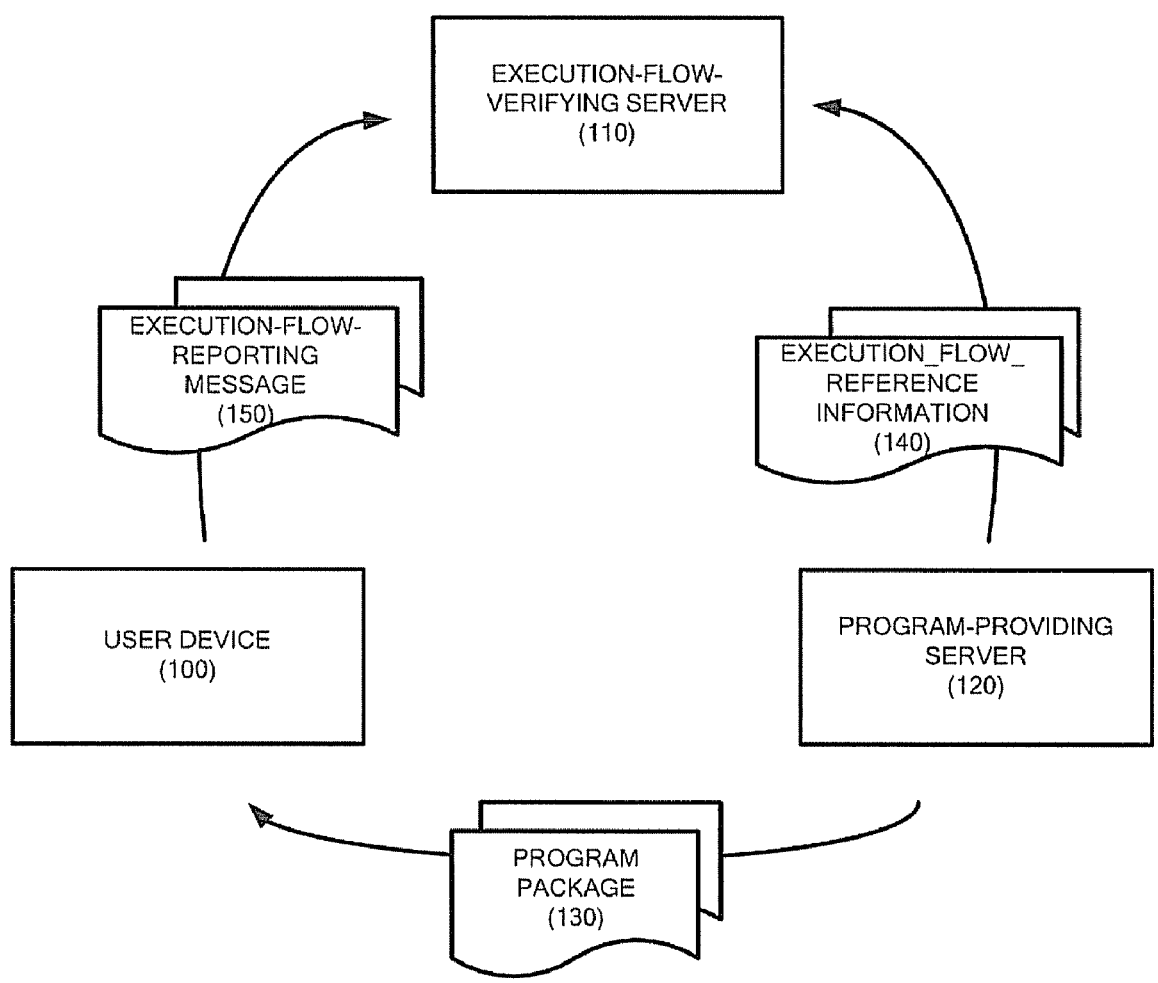
FIG. 1 illustrates an execution-flow-reporting system according to aspects of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates an execution-flow-reporting system according to aspects of the present invention. A programexecution-flow-reporting system includes a user device 100, which is a device such as a mobile phone, a personal digital assistant (PDA), a set-top box, a notebook computer, or a desktop computer that can execute a program, a program-providing server 120 that provides a program package 130 to produce a program in response to a request from the user device 100, and an execution-flow-verifying server 110 that receives an execution-flow-reporting message 150 from the user device 100 and execution-flow-reference information 140 from the program-providing server 120. The execution-flow-verifying server 110 verifies that the information in the execution-flow-reporting message 150 and the information in the execution-flow-reference information 140 are compatible.

The execution-flow-verifying server 110 can limit the execution of a program package 130 operated in the user device 100 according to the determination of the execution-flow-reporting message 150 received from the user device 100 and the execution-flow-reference information 140 received from the program-providing server 120. The execution-flow-verifying server 110 can limit the providing of the program package 130 by the program-providing server 120 according to the determination of the execution-flow-reporting message 150 received from the user device 100 and the execution-flow-reference information 140 received from the program-providing server 120. These may be different according to a configuration method of elements or the program package 130 provided to the user device 100.

Although FIG. 1 depicts the user device 100, the execution-flow-verifying server 110, and the program-providing server 120 as independent devices, the program-execution-flow-reporting system is not limited thereto. For example, the execution-flow-verifying server 110 may be provided in the user device 100. Or, the program-providing server 120 and the execution-flow-verifying server 110 may be combined. Further, the execution-flow-verifying server 110 and the program-providing server 120 may both be provided in the user device 100. To maintain integrity of the execution of the program package 130, the execution-flow-verifying server 110, the program-providing server 120, and the user device 100 may be in one device but logically or physically separate.

The user device 100 is a device that actually uses a program for achieving a predetermined purpose and measures, verifies, and reports an execution flow of the program being executed. Programs executed in the user device 100 are encrypted by using device information of a built-in security module 370 of the user device 100, and the programs executed in the user device 100 are produced and provided by the program-providing server 120. As such, the user device 100 may be a diskless workstation or a smart terminal, depending upon the hardware therein provided.

In the program package 130, the types of content-providing programs provided by an Internet service, electronic commerce, and a computer system are encrypted based on device information of the built-in security module 370 of the user device 100. Preferably, the program package 130 is being executed in the way it was designed to be executed. The program package 130 will be described below in more detail with reference to FIG. 7.

The user device 100 that receives the program package 130 executes a first program included in the program package 130 so as to test whether the corresponding or second program is being executed in the manner for which the second program was designed to be executed. The user device 100 tests an execution flow. Here, the execution flow means a locus of an execution path of the instructions, decided by an operation, a branch, a jump, a choice, a loop, a return, a halt, etc. Accordingly, the execution flow can be expressed as information that reflects instruction values comprising the program package 130 and an execution order of the instructions.

That is, the user device 100 measures or verifies the second program using the first program included in the program package 130 so as to ensure that the second program is executed according to a predetermined purpose. The user device 100 transmits the execution-flow-reporting message 150 for the corresponding result to the execution-flow-verifying server 110. At this time, the user device 100 decides how the execution-flow-reporting message 150 for the execution flow measure and verification is generated based on the execution-flow-verifying information included in the program package 130, and transmits the execution-flow-reporting message 150 corresponding to the result of measuring or verifying of the execution flow. The execution-flow-reporting message 150 may be different according to whether the report result is the result of the execution-flow measuring or the result of the execution-flow verifying.

In the user device 100, the execution-flow measuring can be performed by a predetermined checksum calculation using instructions executed by driving a program as input values, while the execution-flow verifying can be executed by comparing a checksum result value generated as a result of the execution-flow measuring and a predetermined reference measurement value 880. Preferably, the execution-flow verifying needs to include predetermined information necessary for the operation of the user device 100. The entire program or parts of the program package 130 may need to be verified, and, when a program is produced, it is possible to set parts to be verified as execution-flow-verifying targets in the corresponding or second program. One or more execution-flow-verifying targets can be set within a single program. That is, if execution-flow verification is used, the program package 130 produced by the program-providing server 120 should have information and the structure needed for the execution-flow verifying.

The program-providing server 120 is a device that produces the program package 130 in which technologies for the execution-flow measuring, verifying, and reporting are applied as mentioned above. The program-providing server 120 also receives a request originated by the user device 100 for the function of the program, the execution-flow measuring, verifying, and reporting, and produces a package of predetermined programs corresponding to the request.

The program-providing server 120 produces the program package 130 in which technologies for the execution-flow measuring, verifying, and reporting are applied based on the requests transmitted from the execution-flow-verifying server 110. When the program package 130 has been produced, it is transmitted to the user device 100. At this time, the execution-flow-reference information 140 corresponding to the program package 130 is transmitted to the execution-flow-verifying server 110. When the program-providing server 120 transmits the program package 130 to the user device 100, the program package 130 corresponds to the built-in security module 370 of the user device 100.

The execution-flow-verifying server 110 should have a proper authority to receive the execution-flow-reference information 140, and also a proper authority to receive the execution-flow-reporting message 150 from the user device 100. The execution-flow-verifying server 110 should distinguish between multiple user devices 100 that transmit execution-flow-reporting messages 150 such that the execution-flow-verifying server 110 is able to perform management of and additional actions in response to several user devices 100 attempting to execute the program package 130 and when the results of the execution-flow measuring or verifying by the several user devices 100 are different.

The execution-flow-verifying server 110 verifies a state of the program being operated in the user device 100 by comparing the state of the program with the execution-flow-reporting message 150 of the user device 100 according to the execution-flow-reference information 140 transmitted from the program-providing server 120. As such, the execution-flow-verifying server 110 manages execution of the program in the user device 100 according to the execution-flow-reporting message 150 or performs additional actions, such as halting the execution of the program in the user device 100.

When the user device 100 requests a program, the execution-flow-verifying server 110 transmits a request for the corresponding program function, the execution-flow measuring, verifying and reporting for the corresponding program to the program-providing server 120.

Figure 2:
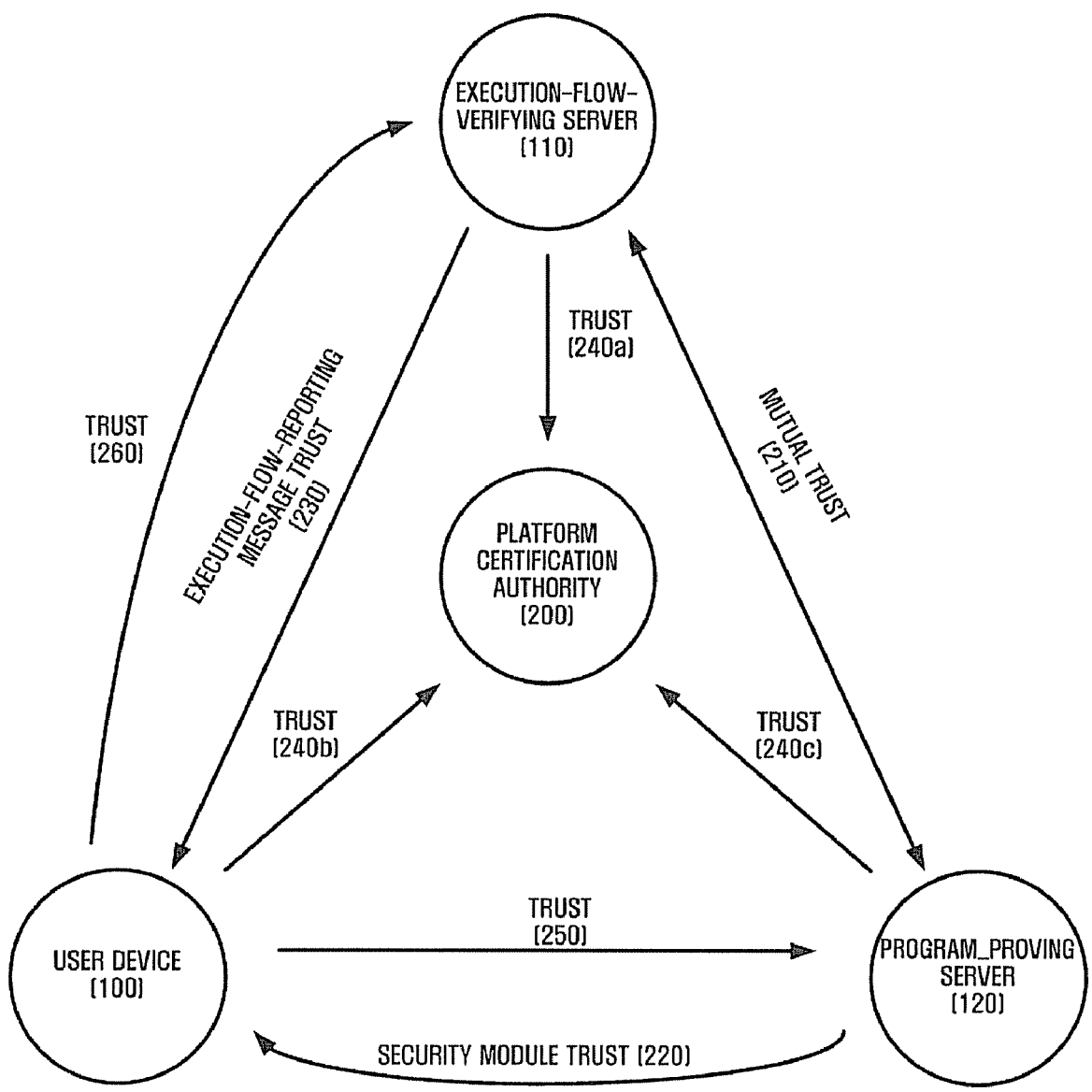
FIG. 2 illustrates a trust model for reporting an execution flow according to aspects of the present invention.

Aspects of the present invention perform the execution-flow measuring or verifying for a predetermined program using these elements, and then safely report the result; it is assumed that there is a trust between the elements, which will be described in detail with reference to FIG. 2. FIG. 2 illustrates a trust model for reporting an execution flow according to aspects of the present invention. A trust model for reporting the execution flow according to aspects of the present invention shows a basic trust direction, target, and scope that exist between devices in the program execution-flow-reporting system of FIG. 1.

With reference to FIG. 2, because each element of the trust model for the execution-flow report corresponds to the program execution-flow-reporting system as described above with reference to FIG. 1, a detailed description of the element has been omitted. However, a detailed description of a platform certification authority 200, a trust direction, target, and scope between the elements will be described.

In the trust model for the program execution-flow report, because it is essential to identify and certify each element, a certification is performed between elements and there are basic trusts 240a, 240b, and 240c for the platform certification authority 200. The user device 100, the program-providing server 120, and the execution-flow-verifying server 110 trust the platform certification authority 200. The platform certification authority 200 is the only authority that identifies the security module included in the corresponding devices, safely provides a certification for a signature-verifying key (not shown) of the corresponding module, and certifies the elements for establishing trust between elements.

The execution-flow-verifying server 110 has a mutual trust relation 210 with the program-providing server 120. As the execution-flow-verifying server 110 and the program-providing server 120 may be configured as a single server that produces a program and verifies a state of the results of the program execution-flow measuring or verifying, the mutual trust 210 is maintained between the execution-flow-verifying server 110 and the program-providing server 120.

Preferably, the user device 100 is not trusted as a forgery may be generated from the user device 100 that uses a program or content provided by the program-providing server (or content-providing server) 120.

Even though there is a possibility of a forgery generated by the user device 100, it is assumed that the security module 370 of the user device 100 is a trustable module at least among elements of the user device 100. After the trust of the security module 370 is verified, the result of the program execution-flow measuring or verifying is reported as the execution-flow-reporting message 150.

As mentioned above, the program-providing server 120 does not trust the user device 100, but the user device 100 trusts the program-providing server 120. However, the program-providing server 120 trusts the security module 370 of the user device 100.

The program-providing server 120 generates and provides the program package 130 bound to the security module 370 via the security module trust 220 for the security module 370 after the user device 100 checks whether the program-providing server 120 is the right server via a certification. Also, a signature of the program-providing server 120 is added to the program package 130 in order to safely provide the program package 130 to the user device 100, and the user device 100 is enabled to operate the program package 130 through verification the signature.

The execution-flow-verifying server 110 does not trust the user device 100 but trusts the security module 370 through the execution-flow-reporting message trust 230 sent to the user device 100 similar to the program-providing server 120. That is, the execution-flow-reporting message 150 of the uncertificated user device 100 includes an electronic signature signed by a signature key of the security module 370 and the execution-flow-verifying server 110 checks the source of the execution-flow-reporting message 150 received from the untrusted user device 100 by verifying the signature key or electronic signature through trust 260 of the security module 370.

When the execution-flow-reporting message 150 is transmitted, the aforementioned method can be used, or the message can be encrypted using a secret key corresponding to a public key of the execution-flow-verifying server 110 or a secret key corresponding to a public key of the security module 370 that may included in the execution-flow-verifying server 110.

Through the above process, the execution-flow-verifying server 110 can trust the execution-flow-reporting message 150 of the user device 100. When the execution-flow-verifying server 110 has been certificated, the user device 100 transmits the execution-flow-reporting message 150 to the execution-flow-verifying server 110.

Figure 3:
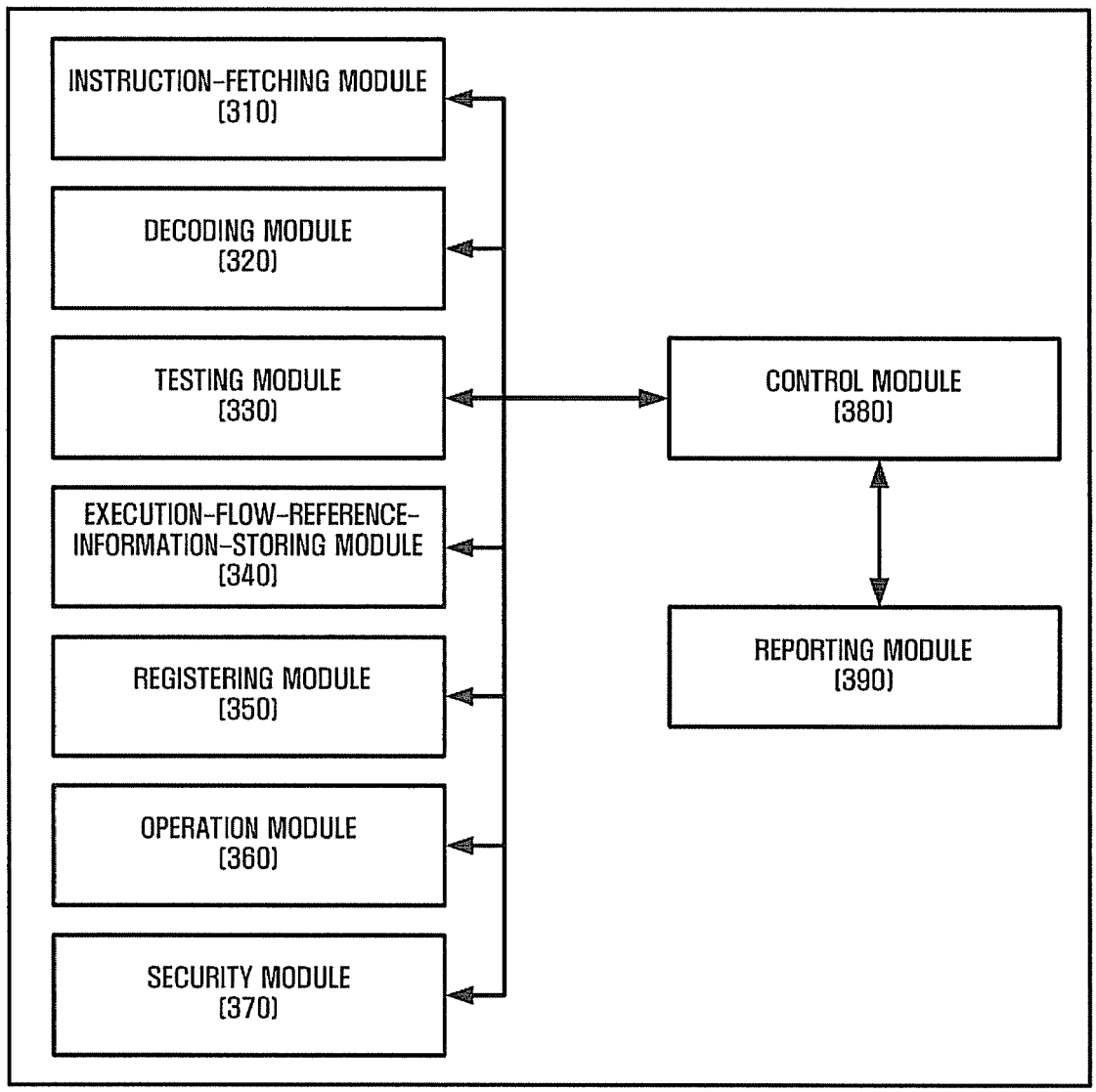
FIG. 3 is a block diagram illustrating an execution-flow-reporting device according to aspects of the present invention.

FIG. 3 is a block diagram illustrating an execution-flow-reporting device according to aspects of the present invention. An execution-flow-reporting device is to measure, verify, and report an execution flow of a predetermined program executed in the user device 100. As shown in FIG. 3, an execution-flow-reporting device 300 includes an instruction-fetching module 310 to test an execution flow, a decoding module 320, a testing module 330, an execution-flow-reference-information-storing module 340, a registering module 350, an operation module 360, a security module 370, a control module 380, and a reporting module 390.

The fetching module 310 fetches instructions from the program package 130 loaded into a main memory of the user device 100 and fetches such instructions in a proper order. Here, the proper fetching order of the instructions can be determined by codes inserted into each instruction, such as an operation, a branch, a jump, and a return. The decoding module 320 decodes instructions fetched by the fetching module 310.

The testing module 330 can perform a function of a main processing device (e.g., CPU) of the user device 100. For the test, the testing module 330 includes an execution-flow-measuring module 400 and an execution-flow-verifying module 410, which will be described in detail with reference to FIG. 4.

The execution-flow-reference-information-storing module 340 stores the execution-flow reference information 140, which will be described with reference to FIG. 8. The execution-flow reference information 140 is decrypted by the security module 370. The execution-flow reference information 140 can be acquired from the security module 370 when an execution-flow-enablement instruction is input. If an execution-flow-disablement instruction is input, the execution-flow-reference-information-storing module 340 can delete the execution-flow reference information 140 therein stored.

The execution-flow reference information 140 stored in the execution-flow-reference-information-storing module 340 is provided to the execution-flow-verifying server 110 when the program-providing server 120 provides the program package 130 to the user device 100, which is to test a state of the program executed in the user device 100 by comparing with the execution-flow-reporting message 150 reported by the user device 100.

Figure 6:
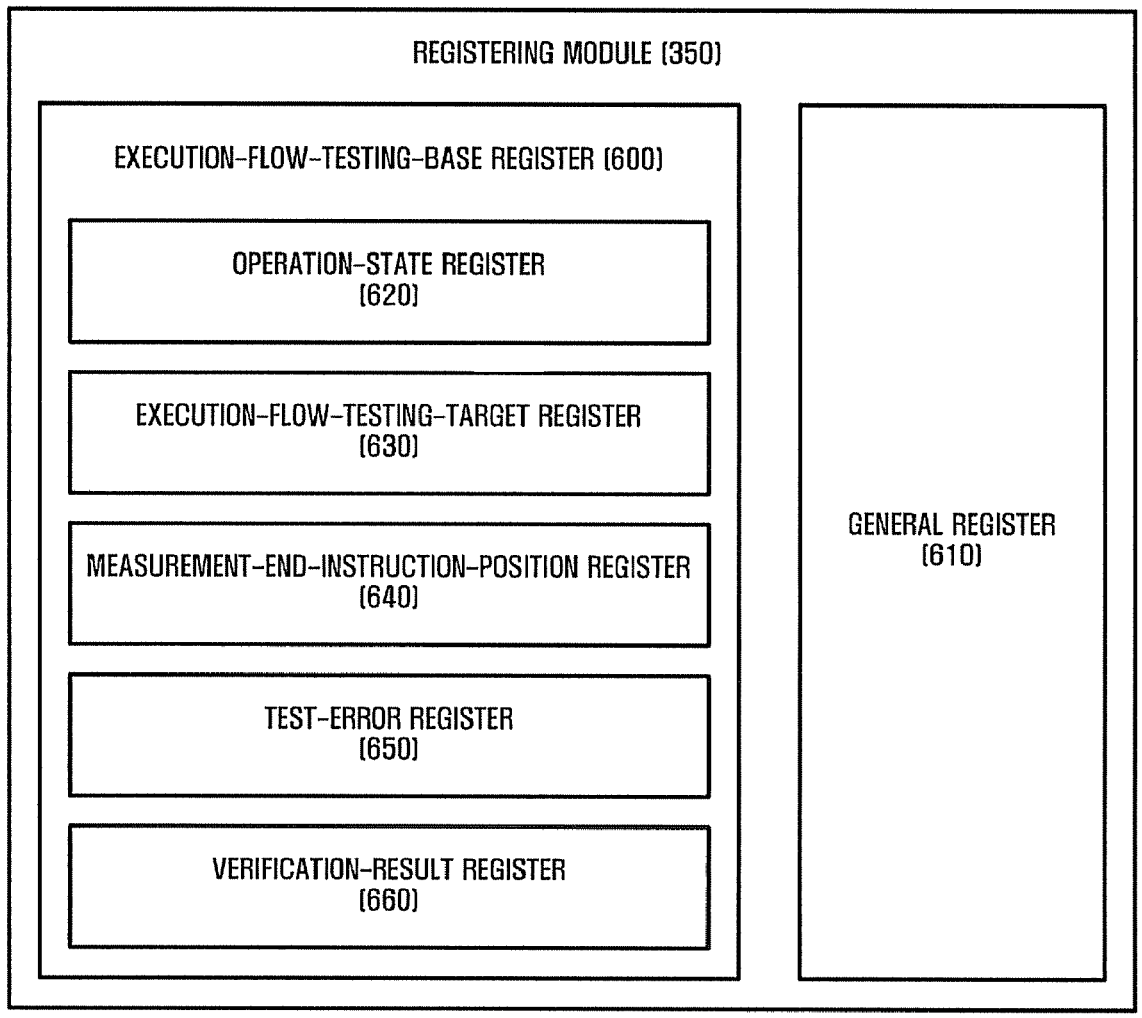
FIG. 6 illustrates a registering module of an execution-flow-reporting device according to aspects of the present invention.

The registering module 350 includes a plurality of registers (shown in FIG. 6). The registers included in the registering module 350 can be divided into execution-flow-testing-base registers 600 and general registers 610, as shown in FIG. 6, which will be described in detail with reference thereto. The operation module 360 executes instructions decoded by the decoding module 320. A non-limiting example of the operation module 360 is an arithmetic logic unit (ALU). The operation module 360 may include multiple ALUs arranged so as to form a microprocessor having multiple execution units and/or cores.

Figure 7:
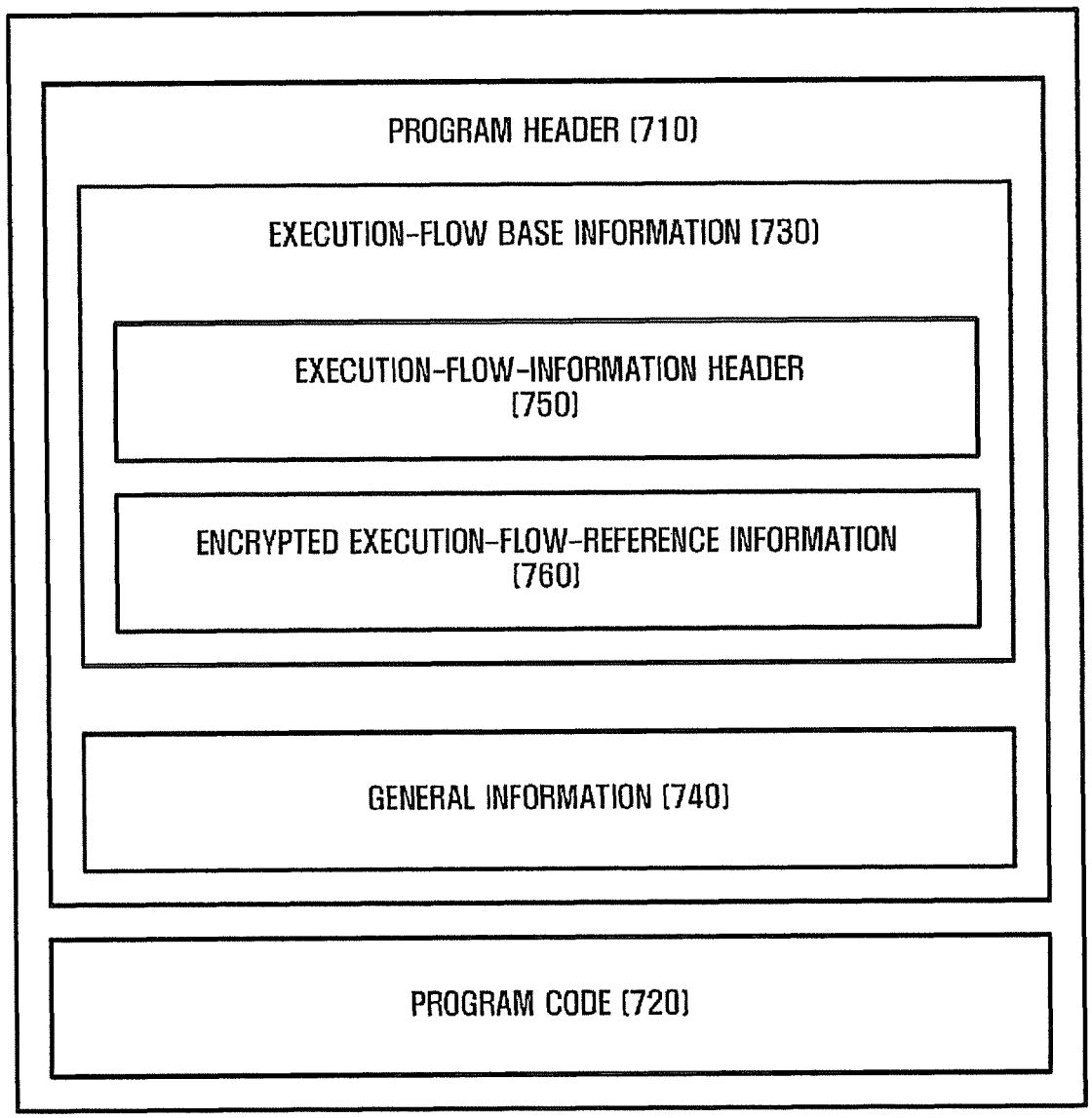
FIG. 7 is a block diagram illustrating a program package according to aspects of the present invention.

If the program package 130 is loaded into main memory (e.g., random access memory or RAM) of the user device 100, the security module 370 reads the execution-flow base information 730 of the program package 130 from the main memory, and decrypts the encrypted execution-flow reference information 760, as described in FIG. 7.

The encrypted execution-flow reference information 760 included in the program package 130 cannot be understood in the main memory because the reference information 760 is encrypted by a secret key of the security module 370. In order to check the encrypted execution-flow reference information 760, the encrypted execution-flow reference information 760 of the main memory is transmitted to the security module 370, decrypted using a public key corresponding to the secret key, and then provided to the testing module 330.

Because the execution-flow reference information 140 acquired by description is important in testing the execution flow of the program package 130, the information is preferably not exposed to other devices or modules except for the execution-flow-reporting device 300. For security, the security module 370 can block the access of an external module or an arbitrary device physically and/or logically.

Further, in order to maintain the security of the execution-flow reference information 140, the encrypted execution-flow reference information 760 can be made so that it cannot be decrypted by other devices or modules except for the security module 370. For example, the security module 370 may include an individual key used in an open key algorithm (e.g., Diffie-Hellman, RSA, ElGamal, or Elliptic Curve), and the execution-flow reference information 140 can be encrypted using a public key corresponding to the secret key held by the security module 370. Here, a device or a module, which is not holding the secret key corresponding to the public key used in encrypting the execution-flow reference information 140, cannot decrypt the encrypted execution-flow reference information 760, while the security module 370 can decrypt the encrypted execution-flow reference information 760.

In FIG. 3, it is illustrated that the security module 370 is included in the execution-flow-reporting device 300, but the security module 370 is not limited thereto and can be separate from the execution-flow-reporting device 300, according to aspects of the invention. Further, the execution-flow-reporting device 300 is not limited to the modules as described above. For instance, the testing module 330 or registering module may be separated logically or physically from the execution-flow-reporting device 300, or other modules may be included therein.

The control module 380 controls an operation process of the modules (310 to 370 and 390) comprising the execution-flow-reporting device 300. Especially, the control module 380 manages the execution-flow testing, and can use information stored in the aforementioned execution-flow-testing-base register 600 for the management of the operation process.

The reporting module 390 reports at least one of the results of the execution-flow measuring or verifying to the execution-flow-verifying server 110, which corresponds to a communication unit (not shown) of the execution-flow-reporting system as illustrated in FIG. 1.

Figure 4:
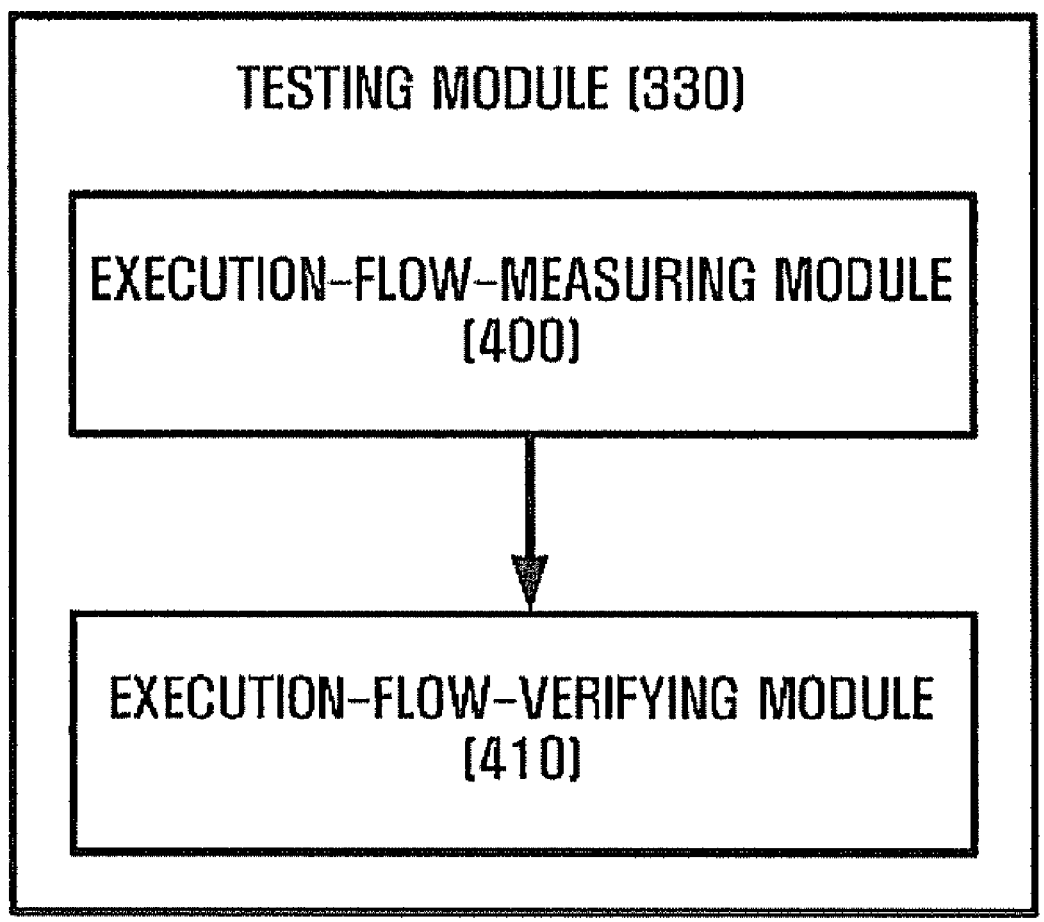
FIG. 4 is a block diagram illustrating a testing module of an execution-flow-reporting device according to aspects of the present invention.

FIG. 4 is a block diagram illustrating a testing module 330 of an execution-flow-reporting device 300 according to aspects of the present invention. The testing module 330 tests an execution flow of instructions decoded by the decoding module 320. For the test, the testing module 330 includes an execution-flow-measuring module 400 and an execution-flow-verifying module 410, as illustrated in FIG. 4.

The execution-flow-measuring module 400 can perform the execution-flow measuring by a checksum calculation using instructions decoded by the decoding module 320 as input values. The instructions, to be objects of execution-flow measuring, are continuously supplied from the decoding module 320 while a program is executed and the execution-flow-measuring operation is performed.

The execution-flow measuring is started as the decoding module 320 decodes a measurement-start instruction, and is terminated when the decoding module 320 decodes a measurement-end instruction. If the decoding module 320 decodes a measurement-resumption instruction, the execution-flow measuring is resumed.

The execution-flow-measuring module 400 will be described in detail with reference to FIG. 5. The execution-flow-verifying module 410 verifies that the execution flow of the program is normal by comparing checksum result values output from the execution-flow-measuring module 400 with a predetermined reference measurement value 880 of FIG. 8. If both values are the same, the execution flow of the instruction is normal, and the program is operating as designed. However, if the two values are not the same, the execution flow of the instructions is not normal, and the program is not operating as designed.

The reference measurement value 880 may be included in the program. For example, the program may contain a checksum result value, which is acquired through the execution-flow measuring performed by the execution-flow-reporting device 300, as the reference measurement value 880 in the program.

In the testing module 330, the reference measurement value 880 is included in the execution-flow reference information 140, and the execution-flow-verifying module 410 can acquire the reference measurement value 880 from the execution-flow-reference-information-storing module 340.

Figure 5:
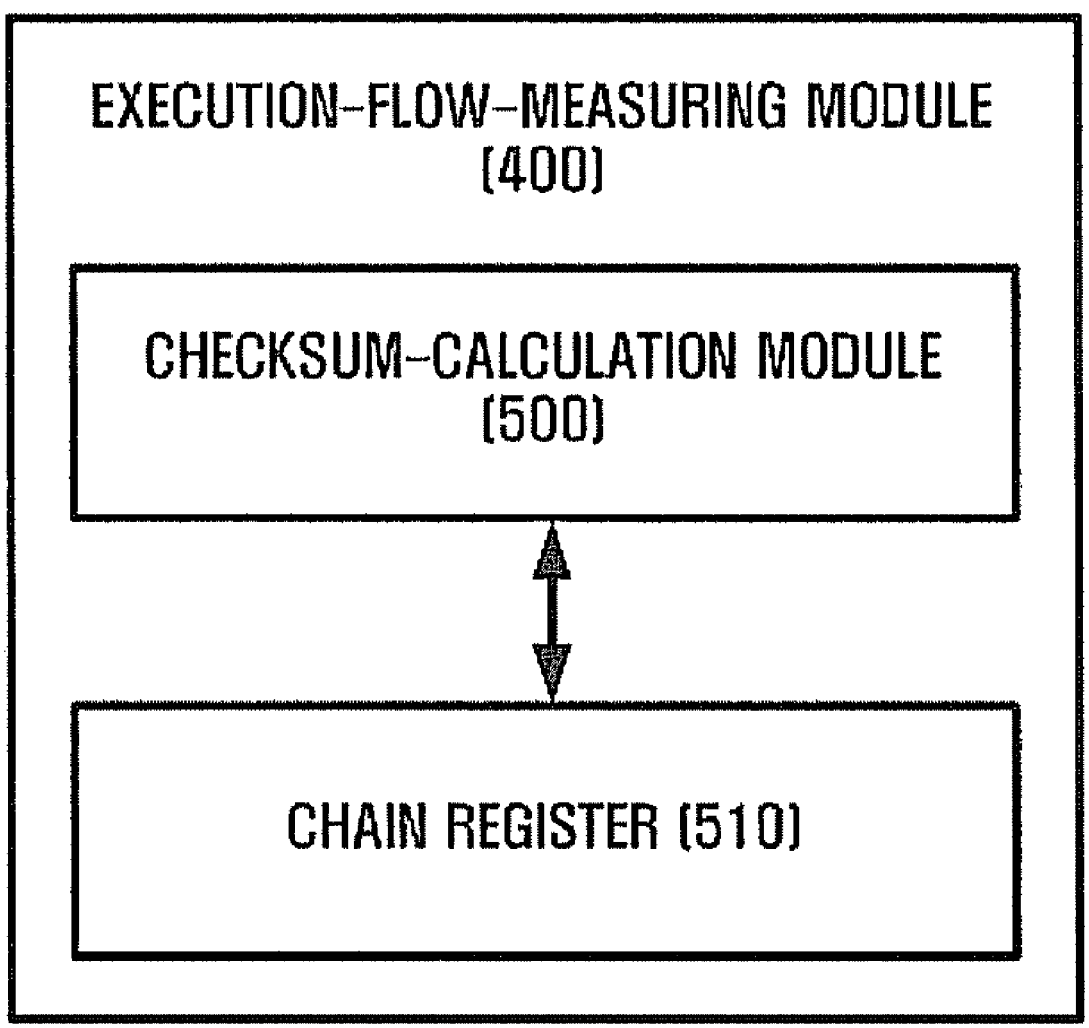
FIG. 5 is a block diagram illustrating an execution-flow-measuring module of an execution-flow-reporting device according to aspects of the present invention.

FIG. 5 is a block diagram illustrating an execution-flow-measuring module 400 of an execution-flow-reporting device according to aspects of the present invention. The illustrated execution-flow-measuring module 400, which is included in the testing module 330, includes a checksum-calculation module 500 and a chain register 510.

The checksum-calculation module 500 calculates a checksum using a current instruction value, a checksum key 870 and the previously-calculated checksum result value as input values. In order to calculate the checksum, the checksum-calculation module 500 can use a predetermined hash function such as Message Digest 5 (MD5) or Secure Hash Algorithm-1 (SHA-1); however, the checksum-calculation module 500 may employ alternatives Secure Hash Algorithm-256 (SHA-256) or any other operation to ensure that the values have not been changed. The checksum-calculation module 500 can also use logic operators such as NAND and AND. For reference, execution-flow-testing base instructions may be excluded from objects of checksum calculation such that the objects of checksum calculation are program-base instructions.

Among input values used for checksum calculation, the checksum key 870 is an input value used to raise the security of the checksum calculation, and can have a random value. The checksum key 870 may be contained in the program package 130. According to aspects shown in FIG. 8, the checksum key 870 is included in the execution-flow reference information 140, and the checksum-calculation module 500 can acquire the checksum key 870 from the execution-flow-reference-information-storing module 340. If a proper checksum key 870 is not recognized, a right checksum result value cannot be acquired.

The chain register 510 stores and holds the checksum result value and provides the value to the checksum-calculation module 500 again. That is, the measuring result of the execution-flow-measuring module 400 or the verifying result of the execution-flow-verifying module 410 is reported to the execution-flow-verifying server 110 as a predetermined format of an execution-flow-reporting message 150. The process of calculating a checksum of the execution-flow-measuring module 400 will be described in detail with reference to FIG. 9.

FIG. 6 illustrates a registering module of an execution-flow-reporting device according to aspects of the present invention. The registering module 350 may be included in the execution-flow-reporting device 300. The registering module 350 may be divided into execution-flow-testing-base registers 600 and general registers 610. The execution-flow-testing-base register 600 may include an operation-state register 620, an execution-flow-testing-target register 630, a measurement-end-instruction-position register 640, a test-error register 650, and a verification-result register 660. The general register 610 may include more registers to manipulate or to store data and/or addresses so as to facilitate the functioning of the registering module 350. However, the execution-flow-testing-base register 600 is not limited thereto such that other registers may be included therein, such as an instruction register or a conditional register, or one or several of the registers may be logically or physically separated therefrom.

The operation-state register 620 stores an operation state on the execution-flow testing. The operation states according to aspects of the present invention can be include deactivation state 1010, measurement-off state 1020, measurement-on state 1030, and measurement-pause state 1040. However, the operation states are not limited thereto.

The deactivation state 1010 indicates that a function for the execution-flow testing of a program has been deactivated. And the measurement-on state 1030 and the measurement-off state 1020 indicate the state where the measuring work is being performed and the state where the measuring work has been terminated, respectively. Also, the measurement-pause state 1040 indicates the state where the execution-flow measuring has been temporarily stopped.

The operation-state register 620 stores one among the aforementioned states, and the operation state of the execution-flow-reporting device 300 is determined depending on the operation state stored by the operation-state register 620.

The execution-flow-testing-target register 630 stores a target identifier to identify the execution-flow-testing target currently being tested among execution-flow-testing targets existing in the program package 130. The target identifier can be acquired in the parameter of the measurement-start instruction if the measurement-start instruction is input. The testing module 330 can identify the execution-flow-testing target currently being tested via the target identifier stored in the execution-flow-testing-target register 630.

The measurement-end-instruction-position register 640 stores position information 890 of the measurement-end instruction included in the execution-flow-testing target being measured by the execution flow. The position information 890 of the measurement-end instruction can be acquired from the execution-flow reference information stored in the execution-flow-reference-information-storing module 340. For example, if the measurement-start instruction is input, the corresponding verification reference information is retrieved by the target identifier included in the measurement-start instruction, and the position information 890 of the measurement-end-instruction included in the retrieved verification reference information is stored in the measurement-end-instruction-position register 640.

In order to execute the program package 130, whenever an instruction is fetched by the instruction-fetching module 310, the control module 380 checks relative address information of the fetched instruction and compares the information with the measurement-end-instruction-position information 890 stored in the measurement-end-instruction-position register 640. Here, the relative address information indicates a relative distance value from the starting position of the program code 720 area to the position of the instruction. As such, the relative distance value of the fetched instruction, as compared to the measurement-end-instruction-position information 890, is compared to an expected relative distance value for the measurement-end-instruction position, as indicated by the measurement-end-instruction-position information 890. If the relative distance and the expected relative distance value are the same, the program is allowed to continue execution.

If the instruction having a relative address matched with the measurement-end-instruction-position information 890 stored in the measurement-end-instruction-position register 640 is a measurement-end instruction, the control module 380 terminates the execution-flow measuring in progress and proceeds with the execution-flow verifying. However, if the instruction having a relative address matched with the measurement-end-instruction-position information 890 stored in the measurement-end-instruction-position register 640 is not a measurement-end instruction, the control module 380 can determine that there is a problem in the execution-flow measuring. Accordingly, the control module 380 can prevent incorrect operation of the execution-flow testing by the change of the measurement-end instruction on the program package 130. If there is a problem in the execution-flow measuring, the testing-error register 650 stores information to indicate such problem.

The verification-result register 660 stores the result of the execution-flow verification. The verification result is one among "unset", meaning there is no information indicating that the execution flow is normal or not normal, "valid", meaning the execution flow is normal, and, "invalid", meaning the execution flow is not normal.

FIG. 7 is a block diagram illustrating a program package according to aspects of the present invention. The illustrated program package 130 may include a program header 710 having predetermined metadata and program code 720 to be executed in the user device 100. The program header 710 may include execution-flow base information 730 and general information 740. And further, the general information 740 may be metadata about the program package 130 and may include various information regarding the program header 710.

The execution-flow base information 730 is used for the execution-flow test according to aspects of the present invention, and may include an execution-flow-information header 750 and encrypted execution-flow reference information 760. The execution-flow information header 750 may include metadata necessary for decrypting the encrypted execution-flow reference information 760. For example, the execution-flow information header 750 can include information representing the nature of the encryption algorithm applied to the encrypted execution-flow reference information 760. If the encrypted execution-flow reference information 760 is decrypted, execution-flow reference information 140 can be acquired as shown in FIG. 8.

The program code 720 consists of a plurality of instructions. The plurality of instructions can be classified as execution-flow-testing-base instructions and program-base instructions. The program-base instructions are for the program itself, and the user device 100 can perform work to achieve a predetermined goal by executing the program-base instructions.

The execution-flow-testing-base instructions are for execution-flow testing and reporting of a program, and the execution-flow-reporting device 300 can control the execution-flow testing of the program package 130 by the execution-flow-testing-base instructions, and report the result of the execution-flow testing to the execution-flow-verifying server 110.

The execution-flow-testing-base instructions may include a measurement-start instruction, a measurement-end instruction, a measurement-pause instruction, a measurement-resumption instruction, an execution-flow-enablement instruction, an execution-flow-disablement instruction, and a state-information-request instruction.

In the program package 130, an execution-flow-testing target can be formed, starting from the measurement-start instruction to the measurement-end instruction. In other words, the measurement-start instruction and the measurement-end instruction are used to set an execution-flow-testing target.

The measurement-start instruction is used to start execution-flow measuring. The measurement-start instruction can include a measurement-start operation code (OP code) that orders start of the execution-flow measuring and a predetermined parameter. A target identifier to identify an execution-flow-testing target can be included in the predetermined parameter. The target identifier can have a form that represents an array order of corresponding sets of verification reference information among the plurality of sets of verification reference information 850-1 to 850-n as illustrated in FIG. 8. Therefore, if there is a plurality of execution-flow-testing targets in a program, the location of a set of verification reference information corresponding to each execution-flow-testing target is located among the plurality of sets of verification reference information 850-1 to 850-n via the target identifier included in the measurement-start instruction of each execution-flow-testing target. The target identifier can also be used to check errors in the execution-flow measuring.

The measurement-end instruction is used to terminate execution-flow measuring. The measurement-end instruction can include a measurement-end operation code that orders termination of the execution-flow measuring and a predetermined parameter. The parameter can include a target identifier to identify an execution-flow-testing target and post-measurement work information that orders work to be performed after the termination of the execution-flow measuring. Execution-flow verifying can be performed after the execution-flow measuring is terminated. The plurality of sets of post-measurement work information that orders work to be performed after the execution-flow measuring may exist.

The measurement-pause instruction is used to temporarily stop execution-flow measuring. The measurement-pause instruction can include a measurement-pause operation code that orders a pause of the execution-flow measuring and a predetermined parameter. A target identifier to identify an execution-flow-testing target can be included in the predetermined parameter.

The measurement-resumption instruction is used to resume execution-flow testing that was temporarily stopped. The measurement-resumption instruction can include a measurement-resumption operation code that orders resumption of the execution-flow measuring and a predetermined parameter. A target identifier to identify an execution-flow-testing target can be included in the predetermined parameter.

The execution-flow-enablement instruction is used to activate a function of performing execution-flow testing. In other words, if the execution-flow-enablement instruction is fetched, the execution-flow-reporting device 300 can prepare performance of execution-flow testing on the program. The execution-flow-enablement instruction can include an execution-flow-enablement operation code that orders activation of an execution-flow-testing function and a predetermined parameter. A target identifier to identify an execution-flow-testing target can be included in the predetermined parameter.

The execution-flow-disablement instruction is used to deactivate execution-flow testing. In other words, if the execution-flow-disablement instruction is fetched, the execution-flow-reporting device 300 can deactivate the execution-flow-testing of the program. The execution-flow-disablement instruction can include an execution-flow-disablement operation code that orders deactivation of an execution-flow-testing function and a predetermined parameter. A target identifier to identify an execution-flow-testing target can be included in the predetermined parameter.

The state-information-request instruction may be used to acquire state information related to execution-flow testing. For example, if an execution-flow-verification result or a state of execution-flow-measurement errors needs to be referred to, the state-information-request information can be used. The state-information-request instruction includes a state-information-request operation code that orders a state-information request and a predetermined parameter. Here, the parameter can include information about a source register to provide state information and information about a destination register to store the provided state information.

However, aspects of the present invention are not limited to the structure of the aforementioned program. Accordingly, the program can be implemented in various forms that include information necessary for measuring and verifying an execution flow, and the program may include logical and/or physical operations.

Figure 8:
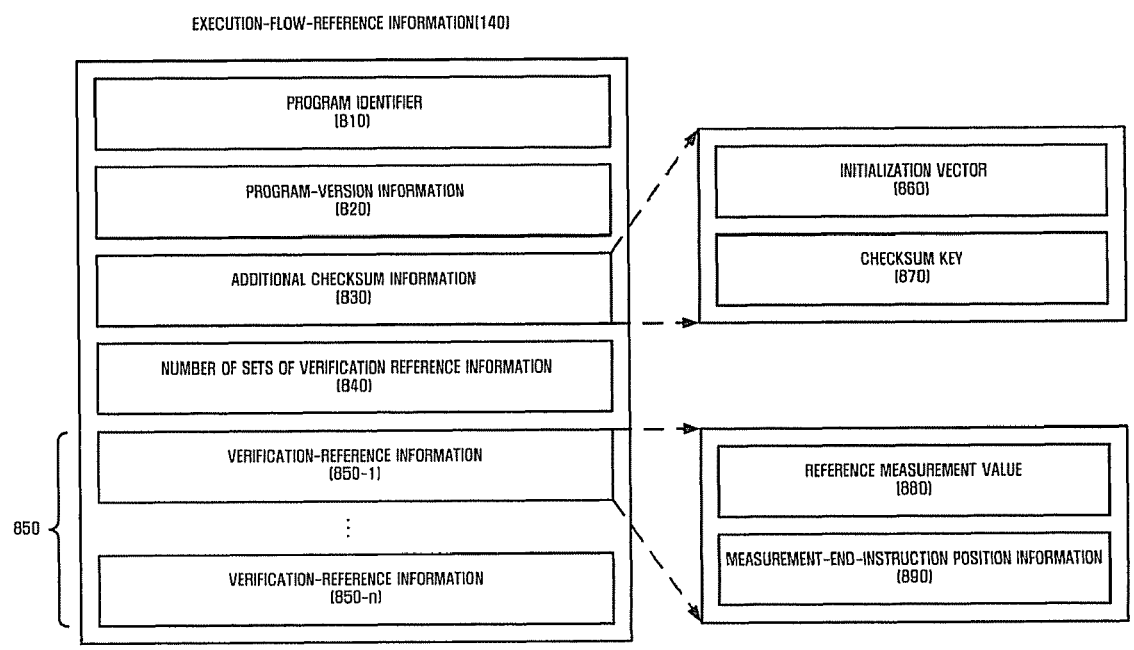
FIG. 8 is a block diagram illustrating execution-flow reference information according to aspects of the present invention.

FIG. 8 is a block diagram illustrating execution-flow reference information according to aspects of the present invention. The illustrated execution-flow reference information 140, which may be included in the encrypted execution-flow reference information 760 in the program package 130 illustrated in FIG. 7, is decrypted in the security module 370.

The execution-flow reference information 140 includes reference information set 850 that includes a program identifier 810, program version information 820, additional checksum information 830, a number of sets of verification reference information 840, and one or more sets of verification reference information 850-1 to 850-*n*. The program identifier 810 is a unique set of information allocated to the program package 130 and the user device 100 identifies different programs by the program identifier 810.

The program version information 820 determines a structure, a type, and a method of using the execution-flow reference information 140, and is used in checking the format of the execution-flow reference information 140. The execution-flow-reporting device 300 can determine whether execution-flow measuring, verifying, and testing need to be performed by comparing the program version information 820 of the program package 130 and version information of the program, stored in the user device 100, to which the execution-flow-reporting device 300 may be applied. For example, the execution-flow-reporting device 300 performs the execution-flow measuring, verifying, and testing if both sets of version information are the same, and the test may not be performed if both sets of version information are not the same.

Figure 9:
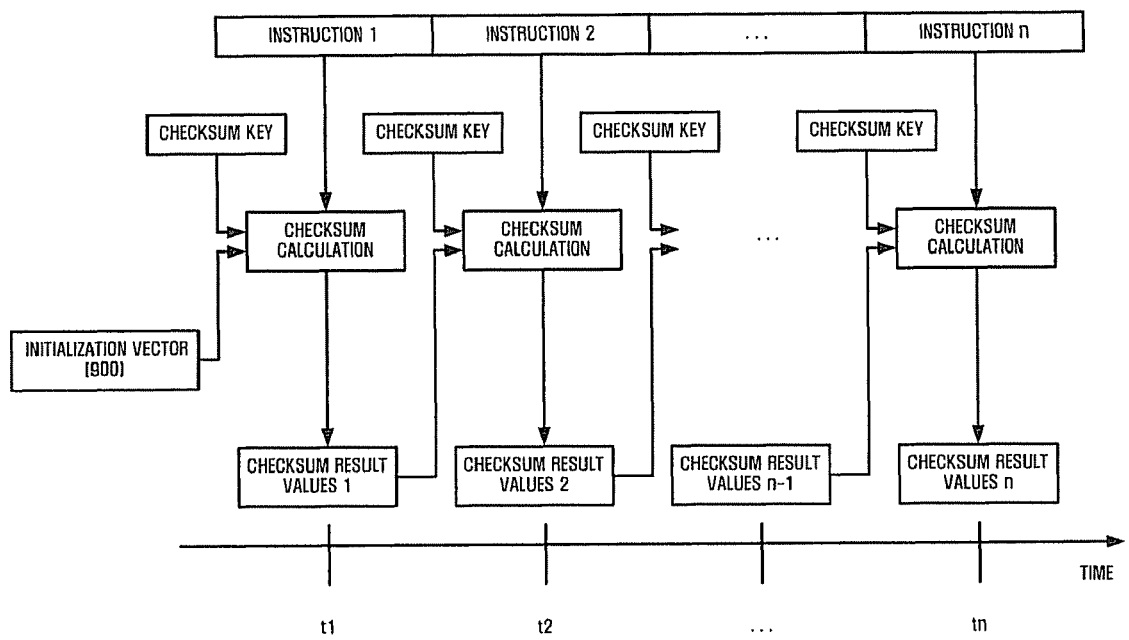
FIG. 9 illustrates a checksum-calculation process according to aspects of the present invention.

The additional checksum information 830 includes information necessary for calculating a checksum on instructions executed when driving the program package 130. The additional checksum information 830 can include appropriate information depending on the checksum algorithm the execution-flow-reporting device 300 uses. For example, the additional checksum information 830 can include an initialization vector 860 and a checksum key 870 as illustrated in FIG. 9. But the present invention is not limited to the vector and the key.

The number of sets of verification reference information 840 indicates the number of sets of verification reference information 850-1 to 850-*n* included in the reference information 140. The reference information set 850 includes one or more sets of verification reference information 850-1 to 850-*n*. Preferably, the sizes of the sets of verification reference information 850-1 to 850-*n* are the same. Each set of verification reference information 850-1 to 850-*n* includes a reference measurement value 880 and measurement-end-instruction position information 890.

The reference measurement value 880 is information that is compared with an execution-flow measurement result when verifying an execution flow of the execution-flow-reporting device 300. The measurement-end-instruction position information 890 represents a position of a measurement-end instruction included in an execution-flow-testing target to which a reference measurement value 880 is applied.

Each set of verification reference information 850-1 to 850-*n* corresponds to an execution-flow-testing target existing in the program package 130. Accordingly, the number of execution-flow-testing targets and the number of sets of verification reference information 850-1 to 850-*n* may be the same. The correspondence of each set of verification reference information 850-1 to 850-*n* with execution-flow-testing targets can be confirmed by a target identifier included in measurement-start instructions, which will be described later. For example, the target identifier can be expressed in a form of information related with an array order of a plurality of sets of verification reference information 850-1 to 850-*n*. Here, if the target identifier is confirmed, the location of one set of verification reference information corresponding to a certain execution-flow-testing target is located among the plurality of sets of verification reference information.

The measurement-end-instruction position information 890 is a relative address value to indicate the position of a measurement-end instruction in the program package 130, and can be calculated as a distance from a start address of a program to the measurement-end instruction. If a malicious change has been made to a program code 720, such as changing or removing the position of instructions related with the execution-flow testing, the measurement-end-instruction position information 890 can be used to detect the change.

In other words, the testing module 330 illustrated in FIG. 4 transmits the execution-flow-reporting message 150 corresponding to the result of the execution-flow measuring or verifying to the execution-flow-verifying server 110. The execution-flow-verifying server 110 tests the execution flow state by comparing the execution-flow-reporting message 150 and the execution-flow-reference information 140, which is included in the program package 130, provided from the program-providing server 120.

FIG. 9 illustrates a checksum-calculation process according to aspects of the present invention. A checksum-calculation process of an instruction stream means instructions listed in the order fetched by the fetching module 310, not the order stored in the main memory. In other words, the output checksum result values 1 to n reflect not only values of instructions themselves but also the order of execution of instructions.

When the checksum-calculation work is performed for the first time at a time t1, as there is no calculated checksum result value, an initialization vector 860 (of FIG. 8) having the same number of bits as the result value is used. Accordingly, when the first checksum is calculated, the checksum-calculation module 500 uses the instruction value, the initialization vector 860, and the checksum key 870 as input values. The initialization vector 860 may be included in the executed program as in the checksum key 870.

After the first checksum calculation is performed, over time the checksum-calculation work is performed using an instruction value, calculated checksum result values 1 to n, and the checksum key 870 as input values. The checksum result values having been calculated are stored in the chain register 510, and then can be provided to the checksum-calculation module 500. For example, an instruction value for instruction 2 of the instruction stream, the checksum result value 1, and the checksum key 870 are input into the checksum calculation and result in the checksum result value 2. As such, to determine the checksum result value n, an instruction value for instruction n, the check sum result value (n−1), and the checksum key 870 are input into the checksum calculation.

For reference, when programs are executed, instructions are sometimes executed in the order stored in the main memory. However, the instructions are sometimes executed by a branch, a jump, or a return regardless of the stored order. Accordingly, an instruction stream is instructions listed in the order fetched by the fetching module 310, not the order stored in the main memory. The output checksum result values reflect not only values of instructions themselves but also the order of execution of instructions.

Figure 10:
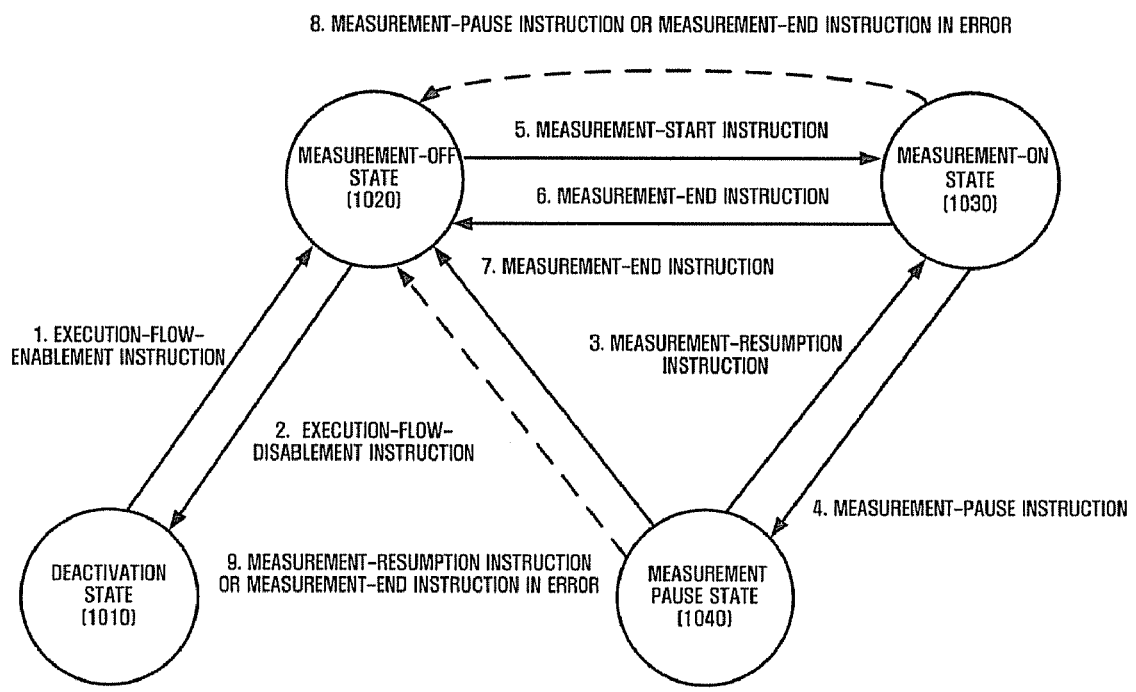
FIG. 10 illustrates transition between operation states according to aspects of the present invention.

FIG. 10 illustrates transition between operation states according to aspects of the present invention. The transition between operation states can be set as one among four operation states 1010 to 1040 as shown, and the operation state can be changed depending on the kind of the current operation of the execution-flow-reporting device 300 and the fetched execution-flow-testing-base instruction.

The initial operation state of the execution-flow-reporting device 300 is the deactivation state 1010, and the operation-state register 620 has been set as the deactivation state 1010. In other words, the execution-flow-reporting function of the execution-flow-reporting device 300 is the deactivation state 1010.

In the case where the operation-state register 620 has been set as the deactivation state 1010, if the execution-flow-enablement instruction is input (operation 1), the operation-state register 620 is set as the measurement-off state 1020. Here, the execution-flow-reporting function of the execution-flow-reporting device 300 is activated, and the execution-flow reference information 140, as decrypted in the security module 370, is stored in the execution-flow-reference-information-storing module 340. The execution-flow-testing target register 630, the verification-result register 660, and the testing-error register 650 are set as "unset" meaning there is no special information regarding the execution flow of the program. In the case where the operation state register 620 has been set as an operation state exempting the deactivation state 1010, if the execution-flow-enablement instruction is input, the control module 380 can disregard it.

Further, in the case where the operation-state register 620 has been set as the measurement-off state 1020, if the measurement-start instruction is input (operation 5), the operation-state register 620 is set as the measurement-on state 1030. Here, the execution-flow-testing-target register 630 stores a target identifier included in the measurement-start instruction, and the position information of the measurement-end instruction included in the execution-flow-testing target is stored in the measurement-end-instruction-position register 640. The position information of the measurement-end instruction can be known through the execution-flow reference information 140 stored in the execution-flow-reference-information-storing module 340. The test-error register 650 and the test-result register 660 are set as "unset." In the case where the operation-state register 620 has been set as the measurement-off state 1020, if the execution-flow-disablement instruction is input (operation 2), the operation-state register 620 is set as the deactivation state 1010.

In the measurement-on state 1030, the execution-flow-reporting device 300 performs the execution-flow-measurement work on general instructions input after the measurement-start instruction. In the case where the operation-state register 620 has been set as an operation state except the measurement-off state 1020, if the measurement-start instruction is input, the control module 380 cannot disregard the instruction.

In the case where the operation-state register 620 has been set as the measurement-on state 1030, if the measurement-pause instruction is input (operation 4), the operation-state register 620 is set as the measurement-pause state 1040. Here, the execution-flow-reporting device 300 temporarily stops the execution-flow measuring. In the case where the operation-state register 620 has been set as an operation state except the measurement-on state 1030, if the measurement-pause instruction is input, the control module 380 can disregard the instruction.

In the case where the operation-state register 620 has been set as the measurement-pause state 1040, if the measurement-resumption instruction is input (operation 3), the operation-state register 620 is set as the measurement-on state 1030. Here, the execution-flow-reporting device 300 resumes the execution-flow measuring on instructions input after the measurement-resumption instruction. In the case where the operation-state register 620 has been set as an operation state exempting the measurement-pause state 1040, if the measurement-resumption instruction is input, the control module 380 can disregard the instruction.

In the case where the operation-state register 620 has been set as the measurement-on state 1030 or the measurement-pause state 1040, if the measurement-end instruction is input (operations 6 or 7), the operation-state register 620 is set as the measurement-off state 1020. Here, the execution-flow-reporting device 300 terminates the execution-flow testing. Then, the execution-flow-reporting device 300 performs the post-measurement work included in the measurement-end instruction. If the post-measurement work is the execution-flow verification work, the testing module 330 compares the calculated measurement result value with the reference measurement value. If both values are the same, the program has been performed as designed, and if both values are not the same, the program has not been performed as designed. Accordingly, if both values are the same, the verification-result register 660 is set as "valid," and if both values are not the same, the verification-result register 660 is set as "invalid." After the execution-flow verifying has been performed, the execution-flow-testing-target register 630 is set as "unset." In the case where the operation-state register 620 has been set as an operation state exempting the measurement-on state 1030 or the measurement-pause state 1040, if the measurement-end instruction is input, the control module 380 can disregard the instruction.

Further, in the case where the operation-state register 620 has been set as the measurement-on state 1030, if the measurement-end instruction or the measurement-pause instruction is input, the control module 380 compares the target identifier included in the measurement-end instruction or the measurement-pause instruction and the target identifier stored in the execution-flow-testing-target register 630. If both identifiers are the same, the execution-flow-measuring operation identifies that the executed program is operating as expected. However, if both identifiers are not the same, the execution-flow-measuring operation experiences identifies that the executed program is not operating as expected. Here, the testing-error register 650 stores information that there has been an error in measuring the execution-flow, and the verification-result register 660 and the execution-flow-testing-target register 630 is set as "unset." Then, the operation-state register 620 is set to the measurement-off state 1020 (operation 8), and the execution-flow measuring is stopped. Such a process can be performed in the same way in the case where the measurement-end instruction or the measurement-resumption instruction is input when the operation-state register 620 has been set as the measurement-pause state 1040 (operation 9). In FIG. 10, the operation-state transition indicated by a dotted line indicates cases where an error has occurred.

Figure 11:
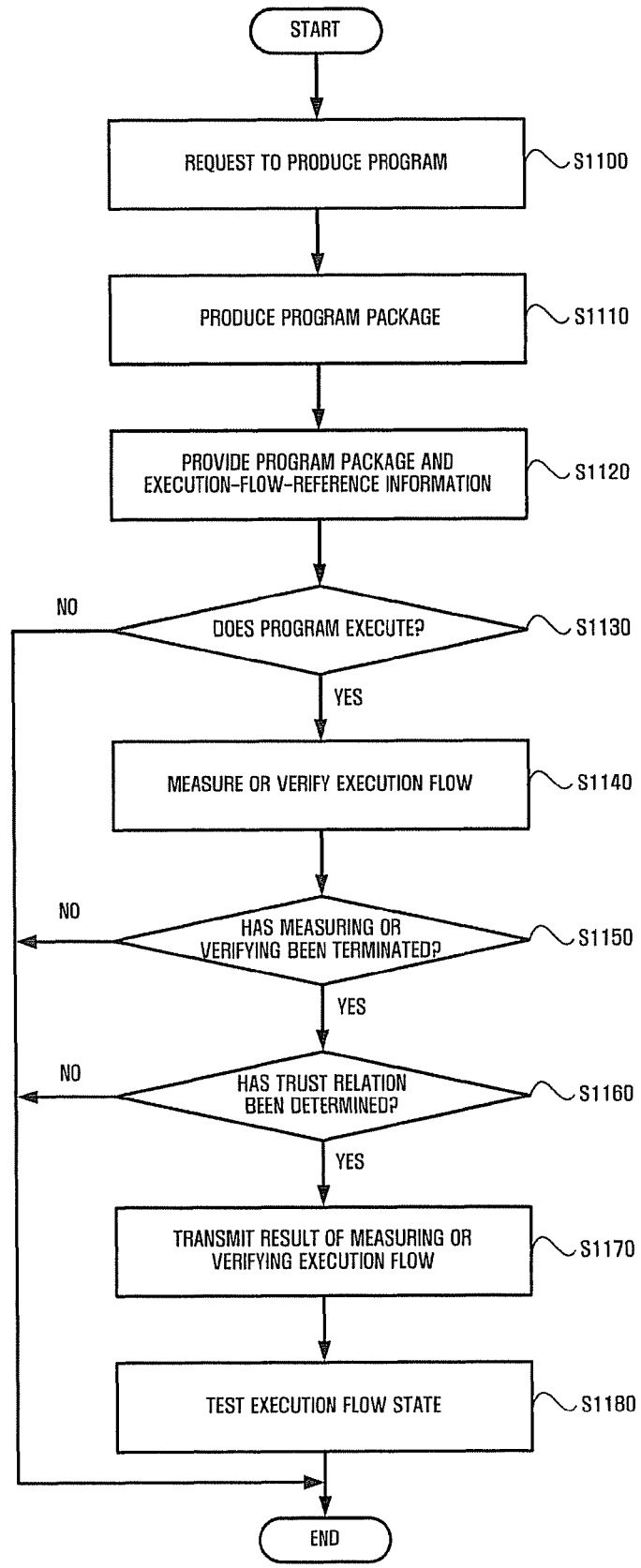
FIG. 11 is a flowchart of an execution-flow report according to aspects of the present invention.

FIG. 11 is a flowchart of an execution-flow report according to aspects of the present invention. The illustrated execution-flow report safely reports the result of the execution-flow measuring or verifying for the program package 130 provided by the program-providing server 120. When a program is requested by the user device 100, the execution-flow-verifying server 110 requests to produce the program from the program-providing server 120 in response to the request from the user device 100 (S1100). When the program has been requested by the execution-flow-verifying server 110, the program-providing server 120 produces the program package 130 corresponding to the request (S1110). Because the user device 100 that requested the program is not trusted, the program-providing server 120 produces the program package 130 in which the execution-flow reporting device 300 is included based on information of the built-in security module 370 of the user device 100. The execution-flow reporting device 300 may be included in the program package 130 before or after the program package 130 is encrypted.

The program package 130 produced by the program-providing server 120 is safely provided to the user device 100 through the trust model illustrated in FIG. 2, and the execution-flow-reference information 140 is also provided to the execution-flow-verifying server 110 (S1120). When the program package 130 and the execution-flow-reference information 140 are provided, the user device 100 determines whether to execute the program (S1130). If the program is not executed, the report for the execution flow is terminated. However, if the program is executed, the execution-flow measuring or verifying for the program operated in the user device 100 is performed (S1140).

While the program is executed, it is determined whether the execution-flow measuring or verifying for the program is terminated (S1150). Because all or some parts of the program may need to be measured or verified, the determination should be continuously performed. After the operation S1150, a trust relation between the user device 100 and the execution-flow-verifying server 110 is determined in order to report the result of measuring or verifying (S1160). Here, the trust relation is determined based on the security module 370 of the user device 100.

After the operation S1160, the result of measuring or verifying the program operated in the user device 100 is transmitted to the execution-flow-verifying server 110 as the execution-flow-reporting message 150 (S1170). Here, the execution-flow-reporting message 150 includes an electronic signature signed by the security module 370 of the user device 100, which verifies the source of the execution-flow-reporting message 150 as received from the execution-flow-verifying server 110.

When the execution-flow-reporting message 150 is transmitted, the execution-flow-verifying server 110 tests a state of the program operated in the user device 100 by comparing the message 150 and the execution-flow-reference information 140 provided by the program-providing server 120 (S1180).

The execution-flow-verifying server 110 can notify an action corresponding to the state test to at least one of the user device 100 or the program-providing server 120. The execution-flow-verifying server 110 provides an action corresponding to the execution-flow-reporting message 150. The action for the execution-flow-reporting message 150 may control the instructions included in the aforementioned program package 130 but is not limited thereto.

As described above, the system and method for reporting an execution flow of a program according to aspects of the present invention produces the following and other effects. For a program operated in the user device, it is possible to efficiently measure the execution flow of a program image throughout execution of the program. Further, it is possible to control the operation of a processor according to the result of the execution-flow measuring. And, it is possible to limit the provision to and execution of the program in a device.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A system for reporting execution flow of a program, the system comprising:
   a program-providing server configured to provide a program package having execution-flow base information;
   a user device configured to:
      receive the program package from the program-providing server;
      perform a predetermined checksum calculation to measure and verify execution flow integrity of the program package with reference to the execution-flow base information, the predetermined checksum calculation using an instruction stream as an input value, the instruction stream comprising instructions being executed through a driving of the program package listed in an order of instruction fetching; and
      transmit an execution-flow-reporting message corresponding to a result of the predetermined checksum calculation; and
   an execution-flow-verifying server configured to limit a providing or an executing of the program package according to a result of testing of the execution-flow-reporting message.

2. The system of claim 1, further comprising:
   a platform certification authority configured to:
      identify a security module in the program-providing server, a security module in the user device, and a security module in the execution-flow-verifying server; and
      provide a certification for a signature of a verifying key of each of the security modules to certify the program-providing server, the user device, and the execution-flow-verifying server.

3. The system of claim 1, wherein:
   the user device comprises a security module having a signature key that is used to electronically sign the execution-flow-reporting message; and
   the user device is further configured to transmit the execution-flow-reporting message to the execution-flow-verifying server.

4. The system of claim 1, wherein the execution-flow-verifying server is further configured to:
   verify an electronic signature of the user device in order to determine a source of the execution-flow-reporting message; and
   determine execution-flow-reporting information based on the result of the testing of the execution-flow-reporting message.

5. The system of claim 1, further comprising:
   an execution-flow-reporting device, comprising:
      a testing module configured to:
         interpret instructions according to the program package; and
         process data;
      a registering module configured to store and to process data corresponding to an execution flow;
      an operation module configured to execute instructions according to the program package;
      a security module configured to establish trusts with other devices; and
      a control module configured to control operation processes of the modules,
   wherein:
      the execution-flow-reporting device is configured to:
         receive the program package; and
         calculate a predetermined checksum using the instruction stream as the input value to measure, verify, and/or test the execution flow of the program contained in the program package to determine proper execution of the program; and the testing module, the registering module, the operation module, the security module, the control module, or any combination thereof is implemented as hardware or a combination of hardware and software.

6. The system of claim 5, further comprising a reporting module configured to communicate results of the measured, verified, and/or tested execution flow to the other devices.

7. The system of claim 5, wherein the program package comprises verification reference information corresponding to execution-flow-testing targets included in the program package.

8. A method of reporting an execution flow of a program, the method comprising:

providing, by a program-providing server, a program package having execution-flow base information to a user device;

measuring and verifying, by the user device, execution flow integrity of the program package with reference to the execution-flow base information, the measuring and verifying of the execution flow integrity comprising calculating a predetermined checksum using an instruction stream as an input value, the instruction stream including instructions being executed through a driving of the program package listed in an order of instruction fetching;

transmitting, by the user device, an execution-flow-reporting message corresponding to a result of the measuring and verifying of the execution flow integrity to an execution-flow-verifying server; and limiting, by the execution-flow verifying server, the providing of or an executing of the program package according to a result of testing of the execution-flow-reporting message.

9. The method of claim 8, further comprising:
identifying a security module included in the program-providing server;
identifying a security module included in the user device;
identifying a security module included in the execution-flow-verifying server; and
certifying the program-providing server, the user device, and the execution-flow-verifying server, the certifying of the program-providing server comprising providing certifications for signature verifying keys of the security modules.

10. The method of claim 8, further comprising:
electronically signing the execution-flow-reporting message using a signature key of a security module of the user device; and
transmitting the signed execution-flow-reporting message to the execution-flow-verifying server.

11. The method of claim 8, further comprising:
verifying an electronic signature of the user device to determine a source of the execution-flow-reporting information; and
determining execution-flow-reporting information based on the result of the testing of the execution-flow-reporting message.

12. The method of claim 8, wherein the testing of the execution-flow-reporting message comprises:
measuring a start instruction of the program; and
measuring an end instruction of the program to determine a length of the program.

13. The method of claim 12, further comprising determining whether the determined length of the program is equal to an expected length of the program included in the execution-flow base information.

14. The method of claim 13, further comprising limiting the execution of the program package if the determined length of the program is not equal to the expected length of the program.

15. The method of claim 13, further comprising not providing the program package if the determined length of the program is not equal to the expected length of the program.

16. The method of claim 8, further comprising fetching instructions from a main memory in an executable order.

17. The method of claim 16, further comprising:
checking relative address information of the fetched instruction; and
comparing the relative address information with the execution-flow base information.

18. The method of claim 17, further comprising limiting the execution of the program package if the relative address information of the fetched instruction does not match a relative address included in the execution-flow base information.

19. The method of claim 17, further comprising:
determining a relative distance value of the relative address information of the fetched instruction; and
determining whether the determined relative distance value is equal to an expected distance value included in the execution-flow base information.

20. The method of claim 19, further comprising limiting the execution of the program package if the relative distance value is not equal to the expected distance value.

21. The method of claim 19, further comprising not providing the program package if the relative distance value is not equal to the expected distance value.

* * * * *